United States Patent [19]

Brunelle et al.

[11] Patent Number: 4,920,200

[45] Date of Patent: Apr. 24, 1990

[54] HYDROQUINONE-BISPHENOL CYCLIC COPOLYCARBONATE OLIGOMER

[75] Inventors: Daniel J. Brunelle, Scotia; David K. Bonauto, Schenectady, both of N.Y.

[73] Assignee: General Electric Company, Schenectady, N.Y.

[21] Appl. No.: 290,053

[22] Filed: Dec. 27, 1988

[51] Int. Cl.$^5$ ............................................ C08G 63/62
[52] U.S. Cl. .................................. 528/370; 528/196; 528/201; 528/204; 528/371; 528/372
[58] Field of Search ............... 528/370, 371, 372, 201, 528/204, 196

[56] References Cited

U.S. PATENT DOCUMENTS

| | | | |
|---|---|---|---|
| 4,605,731 | 8/1986 | Evans et al. | 528/370 |
| 4,644,053 | 2/1987 | Brunelle et al. | 528/371 |

*Primary Examiner*—Harold D. Anderson
*Attorney, Agent, or Firm*—William H. Pittman; James C. Davis, Jr.

[57] ABSTRACT

Cyclic copolycarbonate oligomer mixtures are prepared from mixtures of hydroquinone bischloroformate and bischloroformates of bisphenols, typically bisphenol A or a spirobiindane bisphenol, by condensation in the presence of an amine, an aqueous base and a nonpolar organic liquid. They may be converted to solvent-resistant linear polycarbonates, many of which are crystalline.

6 Claims, No Drawings

HYDROQUINONE-BISPHENOL CYCLIC COPOLYCARBONATE OLIGOMER

This invention relates to cyclic polycarbonates and their preparation. More particularly, it relates to a class of cyclic copolycarbonates convertible to solvent-resistant linear copolycarbonates.

The preparation of cyclic polycarbonates and their conversion to linear polycarbonates is now well known. Reference is made, for example, to U.S. Pat. Nos. 4,605,731, 4,644,053, 4,727,134 and 4,740,583, the disclosures of which are incorporated by reference herein. Under many circumstances, cyclic polycarbonates have at least two advantages over the usual intermediates for polycarbonate formation (e.g., bisphenols and phosgene): first, they may be easily converted to linear polycarbonates of very high molecular weight, and second, they are capable of being employed in reactive processing methods such as reaction injection molding, rotational molding and pultrusion.

Heretofore, the linear polycarbonates prepared from cyclics have had essentially the same physical and chemical properties as known linear polycarbonates prepared by other methods. These properties include solubility in many organic liquids widely employed in industry.

A method for preparing solvent-resistant polycarbonates which has been previously proposed is the use of a crosslinking agent, as disclosed, for example, in U.S. Pat. Nos. 4,604,434, 4,636,559, 4,701,538 and 4,767,840. This method is often effective, but difficulties are sometimes encountered by reason of swelling of the crosslinked polycarbonate in the presence of organic liquids, and loss of ductility with increasing levels of crosslinker. Therefore, interest continues in the development of solvent-resistant polycarbonates without the need for crosslinking or similar reactions.

It has now been discovered that copolycarbonates containing a substantial proportion of hydroquinone carbonate structural units, in combination with bisphenol carbonate units, have a high degree of solvent resistance. In fact, certain of such copolycarbonates, especially those which contain particularly high hydroquinone levels, are crystalline.

Accordingly, the present invention provides a class of intermediates useful for conversion to solvent-resistant linear copolycarbonates. These intermediates are easily prepared and have properties which enable them to be used in integrated resin preparation-processing methods. In many instances, they may be converted to very high molecular weight linear copolycarbonates. Also provided is a method for preparation of such intermediates.

In one of its aspects, the present invention is directed to compositions consisting essentially of cyclic copolycarbonate oligomers having structural units of the formulas

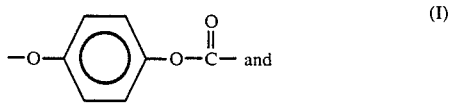

wherein $A^1$ is

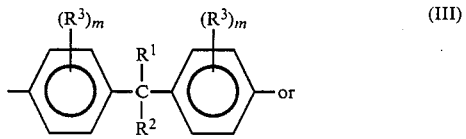

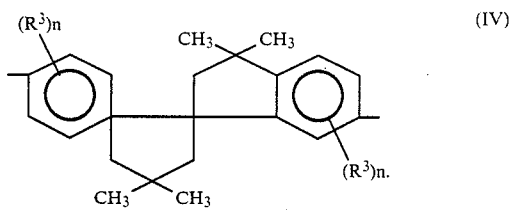

each of $R^1$ and $R^2$ is a $C_{1-4}$ primary or secondary alkyl or $C_{6-10}$ aromatic hydrocarbon radical, $R^3$ is $C_{1-4}$ primary or secondary alkyl or halo, m is 0–4 and n is 0–3; at least 40% of the structural units in said oligomers having formula I.

The compositions of this invention have an overall cyclic structure, apart from the carbocyclic rings present in formulas I, III and IV. They include oligomers having degrees of polymerization from 2 to about 30 and preferably to about 20, with a major proportion being up to about 12 and a still larger proportion up to about 15. Mixtures of oligomers having varying degrees of polymerization are preferred; they have relatively low melting points as compared to single compounds such as the corresponding cyclic trimer. The cyclic oligomer mixtures of the invention are generally liquid at temperatures above 300° C. and most often at temperatures above 225° C.

The cyclic oligomer mixtures of this invention contain very low proportions of linear oligomers, if any. In general, no more than about 5% by weight of such linear oligomers are present. The mixtures also usually contain low percentages (frequently less than 10% and preferably no higher than about 5%) of polymers (linear or cyclic) having a degree of polymerization greater than about 30. Such polymers are frequently identified hereinafter as "high polymer". These properties, coupled with the relatively low melting points and viscosities of the cyclic oligomer mixtures, contribute to their utility as resin precursors, especially for solvent-resistant high molecular weight resins, as described hereinafter.

An essential feature of the compositions of this invention is the presence of hydroquinone carbonate structural units (i.e., units of formula I) in amounts greater than 40% by number. It is these hydroquinone carbonate units which confer on the compositions the property of convertibility to solvent-resistant linear copolycarbonates. Hydroquinone carbonate levels of at least about 50% are preferred. At about 60% and above, said linear copolycarbonates are crystalline.

Also present in the compositions of this invention are carbonate units of formula II. In that formula, $A^1$ may be a bisphenol radical of formula III, in which each of $R^1$ and $R^2$ is an alkyl or aromatic hydrocarbon radical as defined. Most often, both $R^1$ and $R^2$ are methyl.

The $R^3$ radicals may be alkyl or halo as defined, and may be present in quantities up to 4 per aromatic ring. The value of n is usually 0 or 2, and each $R^3$ radical (when present) is usually methyl or bromo. Thus, the radicals of formula III are derived from bisphenols known in the art, especially bisphenol A or 2,2-bis(4-hydroxyphenyl)propane (hereinafter "BPA").

The $A^1$ radicals may also have formula IV; i.e., they may be derived from spirobiindane bisphenols which may contain $R^3$ substituents as previously defined, up to 3 such substituents being present per aromatic ring. The preferred spirobiindane bisphenol is the unsubstituted 6,6'-dihydroxy3,3,3',3'-tetramethylspiro(bis)indane (hereinafter "SBI").

The cyclic oligomer compositions of this invention may be prepared by contacting a mixture of hydroquinone bischloroformates and bischloroformates of a dihydroxyaromatic compound of the formula HO-$A^1$-OH with at least one oleophilic aliphatic or heterocyclic tertiary amine and an aqueous base comprising an alkali or alkaline earth metal hydroxide or carbonate solution, said bischloroformates being maintained in low concentration in a substantially non-polar organic liquid which forms a two-phase system with water; the molar ratio of said amine to said bischloroformates being about 0.06-2.0:1 and the molar ratio of said base to said bischloroformates being at least about 2.4:1. This method of preparation is another aspect of the invention.

The bischloroformate mixture employed in the method of this invention may be a mixture of substantially pure monomeric hydroquinone and bisphenol bischloroformates, which may be prepared, for example, by the reaction of the corresponding dihydroxaromatic compound with phosgene in the presence of a dialkylaniline, as disclosed in British Patent No. 613,280, the disclosure of which is incorporated by reference herein.

For larger scale reactions, it is usually preferred for the sake of economy to employ crude bischloroformate mixtures which may contain oligomeric carbonate bischloroformates, a majority of said oligomeric materials having degrees of polymerization up to about 5. Numerous methods for preparing such crude bischloroformates are known; suitable methods are disclosed, for example, in the following U.S. patents:

| | |
|---|---|
| 3,255,230 | 3,974,126 |
| 3,312,661 | 4,638,077. |
| 3,966,785 | |

The disclosures of these patents are also incorporated by reference herein.

A preferred method for preparing bischloroformate compositions useful in the method of this invention is disclosed in copending, commonly owned application Ser. No. 299,572 filed Jan. 19, 1989. It comprises passing phosgene into a mixture of water, a substantially inert, water-immiscible organic liquid, an alkali metal hydroxide, and hydroquinone or a mixture of hydroquinone and bisphenol A containing at least 40 mole percent hydroquinone; the ratio of moles of water to gram-atoms of alkaline earth metal hydroxide in said mixture being in the range of about 5.0-5.5:1. The following examples are illustrative: all parts are by weight.

EXAMPLE 1

A mixture of 250 mmol. of calcium hydroxide and a 1M solution in methylene chloride of 250 mmol. of hydroquinone was stirred vigorously at room temperature and phosgene was passed in under the surface at a rate of 20-30 mmol. per minute, with simultaneous addition of 1.28 moles of water. Reflux was maintained by means of a solid carbon dioxide-acetone condenser. When the stoichiometric amount of phosgene had been introduced, phosgene addition was discontinued and the reaction mixture was purged with nitrogen. The methylene chloride layer was separated, washed with aqueous hydrochloric acid solution and analyzed by high pressure liquid chromatography; the yield of hydroquinone bischloroformates was found to be 82% of theoretical.

EXAMPLE 2

A mixture of 1.28 moles of water and a methylene chloride solution of hydroquinone and BPA in a 6:4 molar ratio, said solution containing 250 mmol. of dihydroxyaromatic compounds, was vigorously stirred as phosgene was passed in under the surface at a rate of 20-30 mmol. per minute. There was simultaneously added a slurry of calcium hydroxide in methylene chloride, to a total of 250 mmol. of calcium hydroxide. Reflux was maintained by means of a solid carbon dioxide-acetone condenser. When twice the stoichiometric amount of phosgene had been introduced, phosgene introduction was discontinued and the reaction mixture was purged with nitrogen. The methylene chloride layer was separated, washed with aqueous hydrochloric acid solution and analyzed as in Example 1. The yields of hydroquinone and BPA bischloroformates were found to be 67% and 80%, respectively.

The tertiary amines useful in the method of the invention ("tertiary" in this context denoting the absence of N-H bonds) generally comprise those which are oleophilic (i.e., which are soluble in and highly active in organic media, especially those used in the oligomer preparation method), and more particularly those which are useful for the formation of polycarbonates. Reference is made, for example, to the tertiary amines disclosed in U.S. Pat. Nos. 4,217,438 and 4,368,315, the disclosures of which are also incorporated by reference herein. They include aliphatic amines such as triethylamine, tri-n-propylamine, diethyln-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and the bischloroformates is essential for the formation of the cyclic oligomer mixture. For the most part, such amines contain at least about 6 and preferably about 6-14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Also employed in the method of the invention is an aqueous alkali or alkaline earth metal hydroxide or carbonate solution (hereinafter sometimes "aqueous base"), such as lithium, sodium, potassium or calcium hydroxide or sodium or potassium hydroxide, with sodium hydroxide being preferred because of its availability and relatively low cost. The concentration of the solution is not critical and may be about 0.2–16M.

The fourth essential component is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. Methylene chloride is generally preferred.

To prepare the cyclic oligomer mixture according to the above-described method, the reagents are brought into contact under conditions whereby bischloroformates are maintained at low concentration, generally up to about 0.5M. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformates, and optionally other reagents, are added gradually to a reaction vessel containing the organic liquid.

Although addition of bischloroformates neat (i.e., without solvents) is within the scope of this embodiment, it is frequently inconvenient because many bischloroformates are solids. Therefore, they are preferably added as a solution in a portion of the organic liquid. The proportion of organic liquid used for this purpose is not critical; about 25–75% (by weight) of the total, and especially about 40–60%, is preferred.

The reaction temperature is generally in the range of about 0°–50° C. It is most often about 0°–40° C. and preferably 20°–40° C.

For maximization of the yield and purity of cyclic oligomers as opposed to high polymer and insoluble and/or intractable by-products, it is preferred to use not more than about 1.5 mole of bischloroformates per liter of organic liquid in the reaction system, including any liquid used to dissolve said bischloroformates. Preferably, about 0.003–1.0 mole of total bischloroformates is present per liter of organic liquid. It should be noted that this is not a molar concentration in said liquid when the bischloroformates are added gradually, since they are consumed as added to the reaction system.

The molar proportions of the reagents constitute another important feature for yield and purity maximization. The preferred molar ratio of amine to bischloroformates is usually about 0.06–2.0:1 and preferably about 0.1–0.25:1. That of base to bischloroformates is at least about 2.4:1 and preferably about 2.5–3.1:1. In general, lower proportions of base (typically a molar ratio of about 2.4–2.75:1) are employed with a crude bischloroformate composition than with substantially pure monomer bischloroformates (about 2.75–3.1:1).

A factor of some importance is the concentration of available amine, which should be maintained at a level as constant as possible during the entire bischloroformate addition period. If all amine is present in the reaction vessel into which bischloroformates are introduced, its concentration steadily decreases, principally by dilution. On the other hand, if amine is introduced continuously or in equal increments during bischloroformate introduction, its available concentration is initially low and increases more or less steadily during the addition period. These fluctuations can result in a high and constantly varying proportion of high polymer in the product.

It has been found advantageous to introduce the amine in one initial large portion, usually about 40–95% and preferably about 40–75% by weight of the total amount, followed by incremental or continuous addition of the balance thereof. By this procedure, the concentration of available amine is maintained at a fairly constant level in the organic phase during the entire addition period, and it is possible to minimize the proportion of high polymer in the product.

Under these conditions, it is usually advantageous for the reaction vessel to initially contain about 5–40% and preferably about 5–30% of total aqueous base. The balance thereof is also introduced continuously or incrementally. As in the embodiment previously described, another portion of organic liquid may serve as a solvent for the bischloroformates.

Among the other principal advantages of this preferred embodiment are the non-criticality of the degree of dilution of the reagents and the ability to complete the addition and reaction in a relatively short time, regardless of reaction scale. It ordinarily takes a relatively short time to complete cyclic oligomer preparation by this method, and the cyclic oligomer yield may be 85–90% or more. By contrast, use of a less preferred embodiment may, depending on reaction scale, require a much longer addition period and the crude product may contain substantial proportions of linear by-products with molecular weights of about 4,000–10,000, which, if not removed, may interfere with subsequent polymerization of the cyclic oligomers by acting as chain transfer agents.

In this preferred embodiment, the pH of the reaction mixture is typically in the range of about 9–14 and preferably about 12. When bischloroformates (and optionally amine) are added to all of the aqueous base, on the other hand, the initial pH remains on the order of 14 during essentially the entire reaction period.

If desired, any impurities may be removed in the necessary amounts by conventional operations such as combining the crude product, as a solid or in solution, with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers is normally effected by simply separating the same from diluent (by known methods such as vacuum evaporation) and, optionally, from high polymer and other impurities. It is often found that the high polymer being solvent-resistant, is insoluble and separates spontaneously during the reaction. As previously suggested, the degree of sophistication of recovery will depend on such variables as the intended end use of the product.

The invention is illustrated by the following examples. All percentages are by weight unless otherwise designated.

EXAMPLES 3–8

The reaction vessel in these examples was a 5-liter Morton flask fitted with a stirrer, solid carbon dioxide-acetone condenser, addition funnel and two rubber septa to accommodate hypodermic syringes. The flask was initially charged with 500 ml. of methylene chloride, 2.17 g. (21.5 mmol.) of triethylamine and 75 mmol.

of sodium hydroxide in the form of a g.75M aqueous solution.

The mixture in the flask was heated to reflux and there were simultaneously added over a 30-minute period, with efficient stirring, 500 ml. (250 mmol.) of a 0.5M solution in methylene chloride of a monomeric mixture of hydroquinone and BPA or SBI bischloroformates, an additional 2.17 g. of triethylamine (total 43.4 mmol.), and an additional 675 mmol. of aqueous sodium hydroxide. Stirring and refluxing were continued for five minutes, and then the organic phase was separated and washed with aqueous hydrochloric acid solution and several times with deionized water to a pH in the aqueous phase of 6-7.

Isolation of the desired cyclic copolycarbonate oligomers was achieved by simple evaporation of solvent or by steam crumbing (i.e., spraying the methylene chloride solution into water vapor), and the products were dried at 110° C. for 12 hours. The high polymer formed was substantially insoluble in methylene chloride and total yields thereof were less than about 5%; essentially no high polymer was present in the cyclic products.

Table I lists the identities of the bisphenols whose bischloroformates were employed, proportions of bisphenol bischloroformates in the bischloroformate mixtures, yields and approximate melting temperatures of the cyclic oligomer products. The specified melting points are defined as the temperatures at which clear melts were obtained.

TABLE I

| | Example | | | | | |
|---|---|---|---|---|---|---|
| | 3 | 4 | 5 | 6 | 7 | 8 |
| Bisphenol: | | | | | | |
| Identity | BPA | BPA | BPA | BPA | BPA | SBI |
| Mole percent | 60 | 50 | 40 | 30 | 25 | 40 |
| Melting point, °C. | 135 | 170 | 143 | — | 123 | 210 |
| Cyclic oligomer yield, % | 96 | 89 | 80 | 60 | 46 | 88 |

EXAMPLE 9

The reaction vessel of Examples 3-8 was initially charged with 500 ml. of methylene chloride, 17 ml. of deionized water, 4.34 g. (42.9mmol.) of triethylamine and 31.2 mmol. of sodium hydroxide in the form of a 9.75M aqueous solution. The mixture was heated to reflux and there were simultaneously added over a 30-minute period, with efficient stirring, 500 ml. (250 mmol.) of a 0.5M solution in methylene chloride of a crude mixture of 50 mole percent hydroquinone and 50 mole percent BPA bischloroformates, prepared by a method similar to that of Example 2; an additional 4.34 g. of triethylamine (total 43.4 mmol.); and an additional 594.75 mmol. of aqueous sodium hydroxide. Stirring and refluxing were continued for a few minutes, and then the organic phase was separated and washed as in Examples 3-8. The cyclic copolycarbonate oligomers, isolated by steam crumbing and dried, were obtained in high yield.

The cyclic oligomer compositions of this invention are useful as intermediates for conversion to solvent-resistant linear copolycarbonates, some of which are crystalline. Such conversion may be achieved by contacting the cyclic oligomer composition with a polycarbonate formation catalyst at a temperature up to about 350° C. Linear copolycarbonates prepared from said cyclic oligomer compositions, and the method for their preparation, are disclosed and claimed in copending, commonly owned application Ser. No. 290,051.

The polycarbonate formation catalysts which can be used in the resin formation method include various bases and Lewis acids. Basic catalysts are exemplified by lithium phenate, lithium salts of hydroxy-terminated polycarbonates, lithium 2,2,2-trifluoroethoxide, n-butyllithium and tetramethylammonium hydroxide. Also useful are various weakly basic salts such as sodium benzoate, lithium stearate and sodium salts of unsubstituted and substituted phenylacetic acids.

A particularly useful class of Lewis bases is disclosed in U.S. Pat. No. 4,605,731, the disclosure of which is incorporated by reference herein. It comprises numerous tetraarylborate salts, including lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. The preferred catalysts within this class are the tetra-n-alkylammonium and tetra-n-alkylphosphonium tetraphenylborates. Tetramethylammonium tetraphenylborate is particularly preferred because of its high activity, relatively low cost and ease of preparation from tetramethylammonium hydroxide and an alkali metal tetraphenylborate.

Other Lewis acids useful as polycarbonate formation catalysts include dioctyltin oxide; triethanolaminetitanium isopropoxide; tetra(2-ethylhexyl) titanate; polyvalent metal chelates such as bisisopropoxytitanium bisacetylacetonate (commercially available under the trade name "Tyzor AA"), the bisisopropoxyaluminum salt of ethyl acetoacetate and various transition metal acetylacetonates; and unsubstituted and substituted phenylacetic acids.

The resin formation reaction is typically effected by simply contacting the cyclic oligomer composition with the catalyst at temperatures up to 350° C., preferably about 200°-300° C., until polymerization has proceeded to the extent desired. Although the use of a solvent is permissible, it is generally not preferred. In general, the amount of catalyst used is about 0.001-1.0 mole percent based on structural units in the oligomer mixture. Molecular weight can be controlled by varying the amount of catalyst, with a decrease in said amount generally resulting in an increase in molecular weight, or by employing known chain transfer agents, of which diphenyl carbonate is an example, typically in amounts up to about 2.5 mole percent based on structural units in the oligomer mixture. Polymers of very high molecular weights can be prepared, particularly when no chain transfer agents are used.

Among the processing operations which can be conducted simultaneously with polymerization are various extrusion and molding operations. Thus, the cyclic oligomer mixtures may be combined with polycarbonate formation catalysts of the type described hereinabove and fed to an extruder which is maintained at polymerization temperature. The effluent from the extruder is then a polycarbonate in the desired sheet, rod or other form. The molecular weight of the product may be adjusted over a wide range by methods previously described.

Similarly, the cyclic oligomer mixtures may be combined with polycarbonate formation catalysts and injection molded at polymerization temperatures. Said mixtures also have flow properties adequate for rotational molding simultaneous with polymerization. These capabilities make it possible to employ the cyclic oligomer mixtures of this invention in operations previously unavailable with respect to polycarbonates.

The preparation of copolycarbonates from the cyclic oligomer compositions of this invention is illustrated by the following examples.

EXAMPLES 9-12

Solutions in methylene chloride were prepared from various cyclic copolycarbonate oligomers of the invention in combination with 0.1 mole percent of tetra-n-butylammonium tetraphenylborate. The methylene chloride was removed by vacuum evaporation and the mixtures were dried in vacuum for 12 hours at 110° C. Test tubes containing about 500 mg. of each mixture were heated at 300° C. for 15 minutes, in a nitrogen atmosphere. The resulting linear polycarbonates were removed, analyzed and tested for solubility in methylene chloride and tetrahydrofuran. The results are given in Table II; molecular weights are weight average and were determined by gel permeation chromatography relative to polystyrene.

TABLE II

|  | Example |  |  |  |
|---|---|---|---|---|
|  | 9 | 10 | 11 | 12 |
| Cyclic oligomer composition | Ex. 3 | Ex. 4 | Ex. 5 | Ex. 8 |
| Molecular weight | 50,000 | — | — | — |
| Mw/Mn | 2.9 | — | — | — |
| Tg, °C. | 140 | 143 | 143 | 189 |
| Crystalline | No | No | Yes | Yes |
| Tm, °C. | — | — | 305 | 323 |
| Solubility: |  |  |  |  |
| Methylene chloride | Sol. | Insol. | Insol. | Insol. |
| Tetrahydrofuran | Insol. | Insol. | Insol. | Insol. |

EXAMPLE 13

Copolycarbonate plaques containing various proportions of bisphenol A and hydroquinone units were prepared by heating cyclic oligomer mixtures with 0.2 mole percent of tetra-n-butylammonium tetraphenylborate in a mold at 285° C., in the presence of a commercially available mold release agent. The pressure for the first 15 minutes was just sufficient to keep the mold surface in contact with the composition, after which it was increased to 28.1 kg./cm.² and maintained at that level for 2 minutes. The plaques were allowed to cool to room temperature under mold pressure and were then removed.

Notched Izod impact strength determinations were made on the molded plaques, both before and after immersion in premium gasoline for one hour in a stress jig at 239 kg./cm.² followed by drying in an oven for 48 hours at 110° C. The results are given in Table III, in comparison with a commercially available bisphenol A homopolycarbonate as a control.

TABLE III

| Mole % hydroquinone units | 40 | 45 | 55 | Control |
|---|---|---|---|---|
| Izod impact strength, joules/m.: |  |  |  |  |
| Before immersion | 935 | 1042 | 967 | 918 |
| After immersion | 85 | 305 | 876 | 20 |

From these results, the superior gasoline resistance of the copolycarbonates made from the compositions of this invention is apparent. Also apparent is the improved resistance of copolycarbonates containing at least about 50% hydroquinone units.

What is claimed is:

1. A composition consisting essentially of cyclic copolycarbonate oliogomers having structural units of the formulas

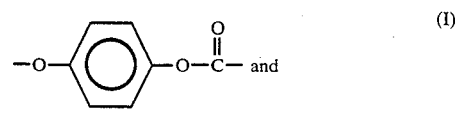 (I)

and

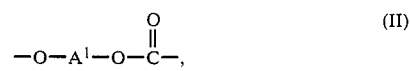 (II)

wherein $A^1$ is

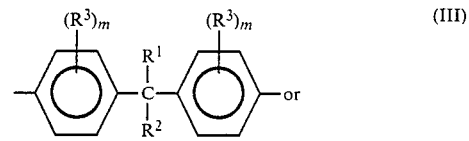 (III)

or

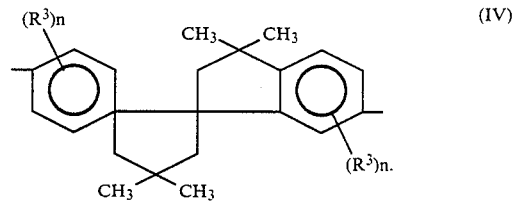 (IV)

each of $R^1$ and $R^2$ is a $C_{1-4}$ primary or secondary alkyl or $C_{6-10}$ aromatic hydrocarbon radical, $R^3$ is $C_{1-4}$ primary or secondary alkyl or halo, m is 0-4 and n is 0-3; at least 40% of the structural units in said oligomers having formula I.

2. A composition according to claim 1 which contains at least about 50% of units of formula I.

3. A composition according to claim 1 wherein $A^1$ has formula III.

4. A composition according to claim 3 wherein m is 0.

5. A composition according to claim 1 wherein $A^1$ has formula IV.

6. A composition according to claim 5 wherein n is 0.

* * * * *